United States Patent [19]
Gillett et al.

[11] Patent Number: 4,728,488
[45] Date of Patent: Mar. 1, 1988

[54] WEAR RESISTANT ZIRCONIUM BASE ALLOY ARTICLE FOR WATER REACTORS

[75] Inventors: James E. Gillett, Greensburg; Donald G. Sherwood, Monroeville; Larry A. Shockling, Plum Borough, all of Pa.

[73] Assignee: Westinghouse Electric Corp., Pittsburgh, Pa.

[21] Appl. No.: 798,193

[22] Filed: Nov. 14, 1985

[51] Int. Cl.$^4$ .................. G21C 5/00; G21C 7/10
[52] U.S. Cl. ......................... 376/327; 376/353; 376/900; 219/76.13
[58] Field of Search ............... 376/307, 333, 353, 900; 376/305; 219/76.13, 76.11

[56] References Cited

U.S. PATENT DOCUMENTS

| | | | |
|---|---|---|---|
| 3,277,267 | 10/1966 | Blaszkowski | 219/76.13 |
| 3,330,734 | 7/1967 | Ashcroft et al. | 376/327 |
| 3,459,917 | 8/1969 | Felts | 219/76.13 |
| 3,766,354 | 10/1973 | Bierwith | 219/76.11 |
| 4,268,586 | 5/1981 | Hanneman et al. | 376/305 |
| 4,346,281 | 8/1982 | Inoue | 219/76.13 |
| 4,376,092 | 3/1983 | Kmonk et al. | 376/353 |
| 4,405,851 | 9/1983 | Sheldon | 219/76.13 |
| 4,432,934 | 2/1984 | Gjertsen et al. | 376/333 |

FOREIGN PATENT DOCUMENTS

| | | | |
|---|---|---|---|
| 0128091 | 12/1984 | European Pat. Off. | 376/353 |
| 0106786 | 8/1979 | Japan | 376/353 |
| 0162093 | 12/1979 | Japan | 376/327 |
| 915807 | 1/1963 | United Kingdom | 376/900 |

OTHER PUBLICATIONS

*Materials for Control Rod Drive Mechanisms,* by G. A. Freund, Rowman & Littlefield, Inc., N.Y., pp. 180,181, 1963.

Corrosion-Nace, vol. 30, No. 12, Dec. 1974, pp. 420-426.

*Primary Examiner*—Harvey E. Behrend
*Attorney, Agent, or Firm*—John J. Prizzi; Donald M. Satina

[57] ABSTRACT

Slender water displacer rods for use in water reactors are provided with rings of a wear resistant coating spaced along the length of the rod. Each coating contains $Cr_2C_3$ and is metallurgically applied and bonded to the zirconium base alloy forming the outer portion of the rod by electrospark-deposition (ESD) technique.

4 Claims, 3 Drawing Figures

WEAR RESISTANT ZIRCONIUM BASE ALLOY ARTICLE FOR WATER REACTORS

The present nvention pertains to ESD (electrospark deposited) coated zirconium base alloy structural elements for use in water reactors. It especially relates to water displacer rods having an ESD coating to minimize wear.

In pressurized water reactor internals design it is required that Zircaloy components come into contact with AISI 304 stainless steel and other non-zirconium base alloy components in an environment of flowing high temperature, high pressure borated and nonborated water. Under these conditions, vibrations may be produced in these contacting components causing repeated impacts and fretting wear to occur in the Zircaloy component, thereby reducing the in reactor lifetime of the Zircaloy component or causing complex and costly structural design changes to reduce the wear rate (if feasible).

Water displacer rodlets are low neutron cross section rods having a tubular Zircaloy cladding containing $ZrO_2$ pellets and helium. These rods may be moveably held above a fuel assembly in a water reactor and are lowered into guide thimbles within the fuel assemblies as needed during reactor operation to displace water (coolant).

Typically 16 to 24 water displacer rods are held suspended above a fuel assembly by a spider vane. There may be 88 such vanes in a reactor.

The tubular Zircaloy cladding is hermetically sealed at both ends and may typically have an outer diameter of about 0.914 inch and a length in excess of about 140 inches. It is now readily apparent that because of the slender structure of the water displacement rods, support is required along their length to minimize vibration due to the flowing coolant while also keeping them aligned with their respective thimble tubes in the fuel assembly.

Examples of water displacer rods, spider vanes and their use are provided in Trevor A. Francis' U.S. patent application Ser. No. 595,154 filed Jan. 13, 1984, and Robert K. Gjertsen et al. U.S. patent application Ser. No. 570,551 filed Jan. 13, 1984 (both assigned to the assignee herein,the Westinghouse Electric Corporation. These patent applications are hereby incorporated by reference.

One area where we have found wear rates to be particularly significant is where water displacer rodlets (i.e. rods) come into contact with AISI 304 stainless (304SS) steel guide supports. We have observed, in fretting wear tests, that while the primary purpose of the 304SS guide supports is to support and protect the rods from excessive wear, the Zircaloy tubular member forming the rod is susceptible to wear due to the relatively poor wear characteristics of the Zircaloy on the 304SS in the pressurized water reactor environment.

ESD coatings are being evaluated as a means to reduce wear between rubbing ferrous base articles in elevated temperature liquid sodium environments. In this regard the reader is referred to: Roger N. Johnson, U.S. patent application Ser. No. 703,856 filed on Feb. 21, 1985; and Gary L. Sheldon, U.S. Pat. No. 4,405,851. The foregoing documents are hereby incorporated by reference.

We propose that the foregoing water reactor wear problems can be minimized by metallurgically bonding as ESD coating to the zirconium base alloy member in the area of contact with the non-zirconium base alloy member. Preferably the zirconium base alloy member is Zircaloy-2 or 4 and the ESD coating is a $Cr_2C_3$ coating of about 1-2 mils in thickness. Preferably that non-zirconium base alloy component is also coated in the area of contact with an ESD coating.

These and other aspects of the present invention will become more apparent upon review of the drawings in conjunction with the following detailed description of the present invention.

DETAILED DESCRIPTION OF THE INVENTION

Figure 1:
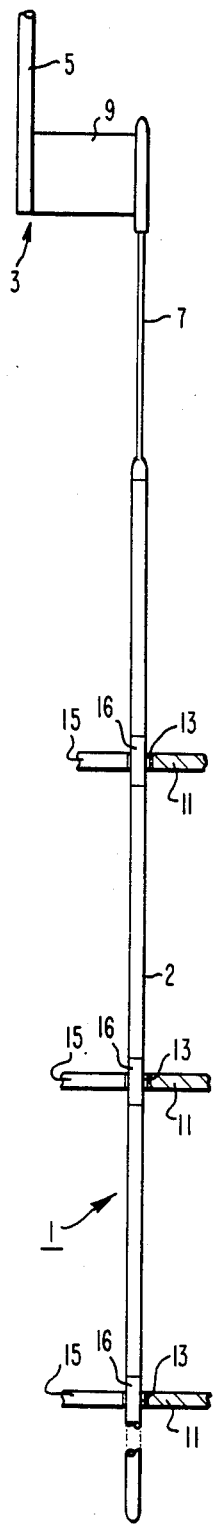
FIG. 1 shows an embodiment of a zirconium base alloy member in accordance with the present invention.

Shown in FIG. 1 is a water displacement rodlet 1 which is composed of an elongate tubular zirconium base alloy (preferably Zircaloy-2 or 4) or a Zirconium-niobium alloy member 2 hermetically sealed at both ends and containing $ZrO_2$ pellets and helium. The rodlet is one of a number of rodlets which is connected to a spider assembly 3. The spider assembly 3 has a drive line 5 for moving the rodlets into and out of the thimble tubes of a nuclear fuel assembly. Rodlet 1 is connected to the spider assembly by a rodlet flexure member 7 located at the end of one of the spider vanes 9.

Distributed along the length of the rodlet 1 are plates 11 which exend transversely with respect to the longitudinal axis of the rodlet 1. Preferably there are six such support plates 11. Each support plate 11 is perforated through its thickness by holes 13 which are connected to each other by slots 15. Slots 15 and holes 13 are configured and sized to provide support to the rodlets while allowing the rodlets 1 and the spider assembly 3 to readily travel up and down through the support plates 11 without binding. The support plates are composed of a non-zirconium base alloy, preferably a stainless steel such as AISI 304 stainless. The rodlet flexure member 7 provides flexibility to prevent jamming of adjacent rodlets in the support plates. These flexures then permit small gaps to further reduce wear.

As shown in FIG. 1 the rodlet in accordance with the present invention has been coated with a wear resistant ESD coating on the outside diameter surface of the zirconium base alloy tubular member 2 in those areas of the tubular member in the vicinity of the holes in support plates 11.

Figure 2:
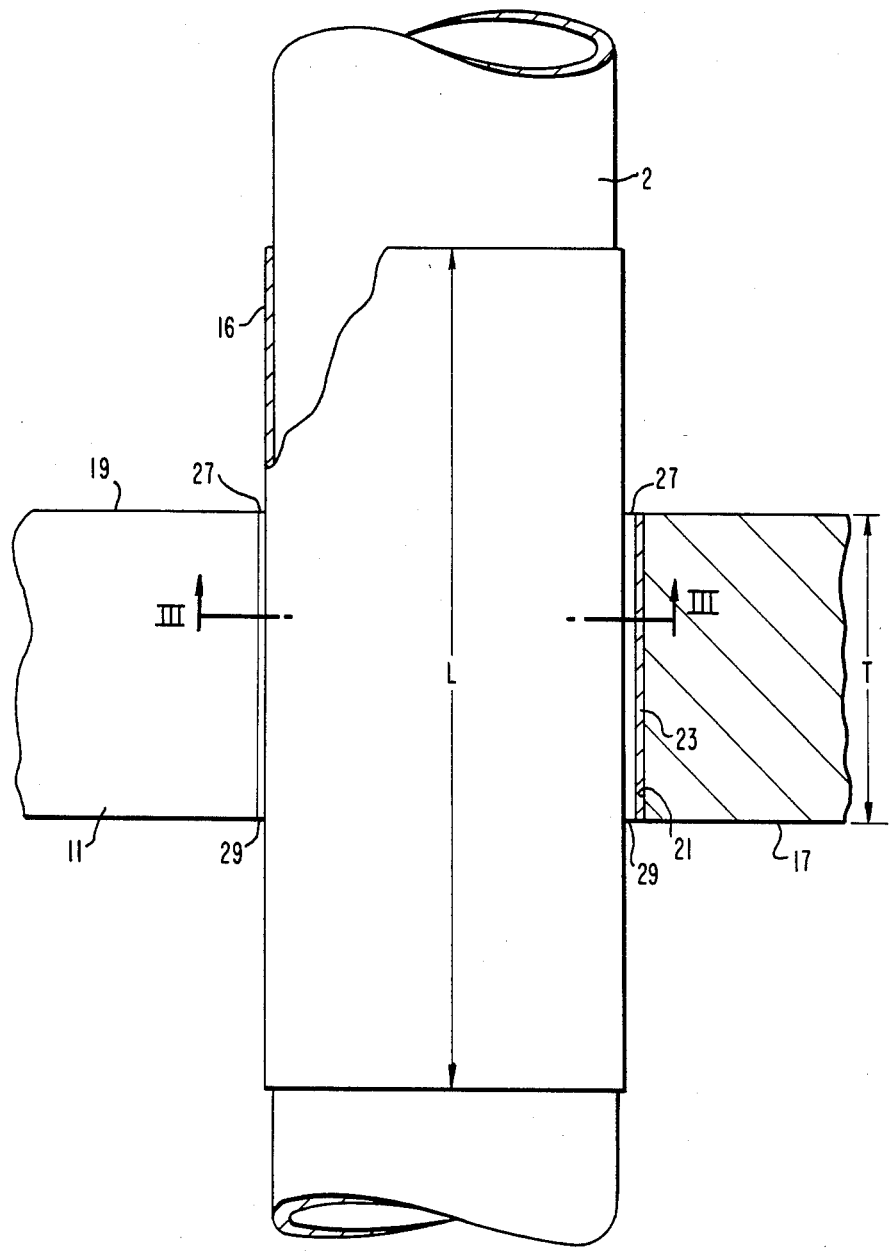
FIG. 2 is an enlarged view of a coated portion of the zirconium base alloy member shown in FIG. 1 and an adjacent coated support member.

This is more clearly shown in FIG. 2 which is an enlarged view of the zirconium base alloy tubular member 2 in the vicinity of a support plate 11. It is preferred, as shown in FIG. 2, that the length of tube, L, having tube ESD coating 16 thereon at any one location should exceed the thickness, T, of the support plate 11, and more preferably, the coated portion of the tube should extend below plane of the bottom face 17 and above the plane of the top face 19 of support plate 11. Most preferably the coated length, L, is at least about three times the thickness, T, of plate 11.

As also shown in FIG. 2, it is preferred that surface wall 21 of hole 13 which communicates with top surface 19 and bottom surface 17 of the support plate 11, also have an ESD coating 23 on it. ESD coating 23 may be selected from those described in the aforementioned Johnson patent application relating to ESD coatings. Alternatively, an improved ferrous alloy for wear may be substituted for the 304SS support 11 eliminating the need for ESD coating 23.

Figure 3:
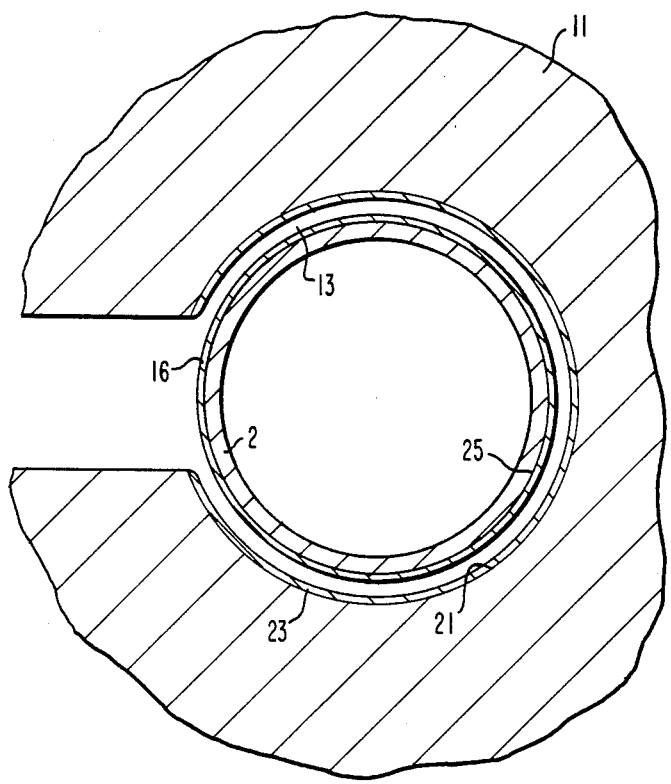
FIG. 3 is a transverse cross section through the coated portion of the zirconium base alloy member shown in FIG. 2 taken along III—III.

A transverse cross section through the tabular member 2 and the support plate 11 is shown in FIG. 3. The tubular member is preferably Zircaloy-2 or 4 in a fully recrystallized, partially recrystallized or cold worked and stress relief annealed condition. Metallurgically bonded to the outer surface of tube 2 is a relatively thin ESD coating 16. The Zircaloy tube may have an outside diameter of about 0.91 inches and a wall thickness of about 0.055 inches while the ESD coating has an average thickness between about 0.001 and 0.002 inches. At and near the metallurgical bond 25 between the coating 16 and the tube 2 is a diffusion zone and heat affected zone that may extend a few thousands of an inch into the wall of the tube 2, but leaves the bulk of the wall thickness in its original metallurgical condition. The ESD coating 16 is preferably obtained from a cemented $Cr_2C_3$ electrode as described in the aforementioned Johnson patent application.

The ESD coating 23 on the wall 21 of the aperture 13 in support plate 11 also has a thickness of about 0.001 to 0.002 inches, but does not necessarily have the same composition as that found in coating 16 on tube 2. In addition to differences in coating composition caused by the diffusion of base metal into the coating (e.g. Zr in the case of tube 2 and Fe in the case of plate 11), the coating composition itself may differ in order to optimize the resistance of the wear couple to fretting wear under water reactor operating conditions. For example the coating 23 may be selected from those ESD coatings in accordancw with the invention described in the aforementioned Johnson patent application.

While FIGS. 2 and 3 indicate that the surface of wall 21 of hole 13 has been entirely coated, it is also contemplated that wall 21 may remain uncoated or coated in only certain areas, for example in the areas of wall 21 wich is in close proximity to the juncture 27 of wall 21 and top face 19 and the juncture 29 of wall 21 and bottom face 17.

The preceding examples have clearly demonstrated the benefits obtainable through the practice of the present invention. Other embodiments of the invention will become more apparent to those skilled in the art from a consideration of the specification or actual practice of the invention disclosed herein. It is intended that the specification and examples be considered as exemplary only, with the true scope and spirit of the invention being indicated by the following claims.

We claim:

1. In a water reactor operating environment, the combination having improved fretting wear resistance comprising:
   an elongated tubular water displacer rod; having a low neutron absorption cross section
   guide support plates distributed along the length of said water displacer rod;
   said water displacer rod intersecting said guide support plates through apertures in said guide support plates;
   said water displacer rod having a plurality of spaced apart annular electrospark deposited coatings, each said coating facing the wall of a respective said aperture, said electrospark deposited coatings comprising $CR_2C_3$;
   wherein said water displacer rod has a tube wall composed of a zirconium base alloy;
   and wherein said guide support plates are composed of a stainless steel alloy.

2. The combination according to claim 1 further comprising:
   a second electrospark deposited coating metallurgically bonded to said walls of said apertures.

3. The combination according to claim 1 wherein said coating is about 0.001 to about 0.002 inches thick.

4. The combination according to claim 1 wherein said zirconium base alloy is selected from the group consisting of Zircaloy-2, Zircaloy-4 and zirconium-niobium alloys.

* * * * *